United States Patent [19]
Sperberg

[11] 4,338,989
[45] Jul. 13, 1982

[54] POLY SPRING TIRES

[76] Inventor: Lawrence R. Sperberg, 6740 Fiesta Dr., El Paso, Tex. 79912

[21] Appl. No.: 186,707

[22] Filed: Sep. 12, 1980

Related U.S. Application Data

[63] Continuation of Ser. No. 637,952, Dec. 5, 1975, Continuation-in-part of Ser. No. 567,599, Apr. 14, 1975, abandoned.

[30] Foreign Application Priority Data

Apr. 12, 1976 [FR] France .............................. 76 10681
Apr. 12, 1976 [IT] Italy ............................. 22327 A/76
Apr. 12, 1976 [GB] United Kingdom .............. 14781/76
Oct. 23, 1978 [ZA] South Africa ....................... 78/5967
Oct. 24, 1978 [AU] Australia ........................... 41012/78
Oct. 25, 1978 [NZ] New Zealand ....................... 188728
Oct. 30, 1978 [IN] India .................................. 1175/78

[51] Int. Cl.³ ........................ B60C 9/10; B29H 17/14
[52] U.S. Cl. ....................... 152/354 RB; 152/362 R; 156/133; 156/123
[58] Field of Search ................................ 152/354–357, 152/362 R, 362 CS, 361 R; 156/123 R, 132, 133

[56] References Cited
U.S. PATENT DOCUMENTS

3,160,192 12/1964 Drew ................................ 152/355
3,386,486 6/1968 Kovac et al. ........................ 152/354
3,581,793 6/1971 Wittneben ............................ 152/354
3,612,135 10/1971 Wittneben ............................ 152/361
3,672,423 6/1972 Duduk ................................... 152/356
3,682,217 8/1972 Marzocchi ............................ 152/356
3,780,782 12/1973 Jennings et al. ..................... 152/356

Primary Examiner—John E. Kittle

[57] ABSTRACT

A pneumatic tire having spaced beads and a pair of biased inner plies tied to each bead, upon which is placed a third ply disposed at a greater angle to the equatorial plane than the underlying bias plies, resulting in the outermost ply cords being "loose" in comparison to the innermost ply cords being "tight" after the tire shaping operation. The cords of the outermost ply assume a shorter effective length along with an increase in their twist (tpi) in the inflated shaped vulcanized tire than the length and twist as laid down on the building drum. A further proviso is that the cords of the third ply shall be at some degree of compression greater than as laid down on the building machine, with said compression being the maximum attainable by the cords as a consequence of the bias cords pantographing during the shaping of the tire. This building block of two plies of cords at higher tension combined with a ply of cord at lower tension results in a new and unusual tire of unexpected structure and performance characteristics.

22 Claims, 28 Drawing Figures

POLY SPRING TIRES

CROSS REFERENCE TO RELATED APPLICATIONS

Ser. No. 637,952 filed Dec. 5, 1975 entitled POLY SPRING TIRES of which the instant application is a continuation, and Ser. No. 567,599 filed Apr. 14, 1975 entitled HYBRID TIRE now abandoned, of which the instant application is a continuation in part.

BACKGROUND OF THE INVENTION

1. Field of Invention

Since the invention of the pneumatic tire by Robert Thompson in 1845, the original art and concepts of tire technology have slowly evolved toward a more scientific understanding of how a tire performs. Certainly it is logical to assume that the original tire as invented probably claimed as one of its attributes the ability to cushion carriages from road shock since the tire itself appears to have been little more than a heavy inner tube covered with a layer of tough, durable leather. The original invention never became popular as evidenced by historical events, and it is again reasonable to assume that a major reason for the tires' failure to achieve popularity may have been associated with the primitive state of rubber chemistry, especially vulcanization, and this primitive state of knowledge probably resulted in an inner tube of extremely poor durability. From the beginning, carriage ride and tire durability have been inextricably intertwined. Since hindsight is possessed with 20/20 vision, it becomes obvious from studying tires' historical past that the concepts of softer ride inherent in the pneumatic tire continued to occupy a dominant position in tire technologists' minds and further that this concept was continuously being tempered by the practical reality of manufacturing tires with adequate durability.

The original pneumatic tires were built on mandrels shaped to duplicate the tire's air cavity and the earliest reinforcement material used was square woven cotton cord fabric. The problems associated with trying to wrap an 80″ long piece of fabric around the mandrel and to uniformly compress the fabric to the lesser length dictated by the circumference of the beads of the tire, forced someone to invent the first expandable drum type of tire building machine which permitted the tire to be built on a flat drum so that the green tire as built resembled an open ended barrel configuration which is then lifted or lofted into the toroidal configuration typical of tires built originally on mandrels. At this stage, the mass of steel, rubber, and cord is set by vulcanization. Expandable drum building machines vary in minor detail and the same machine can be used to build a variety of sizes by the simple expedient of making the building drum wider as a larger cross section tire is required.

Tire development takes place slowly and each new development nominally is predicated upon a previous tire's deficiencies in the market place as contrasted to an engineer's starting out with a clean sheet of paper to design an entirely new tire. One such entirely new development and conception of the pneumatic tire was the original radial tire which differed in the extreme from the conventional tires made wherein square woven fabric was used. The original radial tires as built utilized cord, as contrasted to square woven fabrics in use in "bias" constructed tires. The original introduction of cords as we know them today was simply a step of unravelling the warp and woof of square woven fabric existent in one plane to where the warp cords were segregated in one plane separate and distinct from the woof cords segregated in still another plane.

Tires from their very inception by Thompson have unfortunately been prone to undergo destructive failure in contrast to their successfully wearing out. The original aim of tire manufacturing companies was to increase the number of miles a tire would go before it did fail. The next step in the improvement of tire durability was to build tires that might wear out before they failed, and this was followed by the desire to make tires go a greater number of miles before they would wear bald, and about the time that this objective may have been achieved, the further limitation was imposed to make the tire softer riding which resulted in more tire failures, ad infinitum.

Almost everyone attempting to build a better tire traditionally insists upon arranging all cord paths of each individual ply fabric in straight curvilinear lines with the reasoning being that the straighter the cord, the more uniform will be the tension within and between the various cords; and therefore, the more uniform the tire will be so far as regards its dynamic stability. This hypothesis is urged in my issued Pat. No. 3,807,475 as well as in U.S. Pat. No. 3,563,088 and U.S. Pat. No. 3,722,270, and others.

Tire failure has been traditionally associated with lack of tire strength. When a tire fails, tire design engineers by rote increase tire strength either by putting more cords in the tire body, or by making each cord bigger so that each cord is stronger in itself, or by going to a stronger cord of a different chemical composition. Thus, the original cotton cord was replaced by rayon which in turn was partially replaced by nylon which in turn was partially replaced by polyester, and ad infinitum to steel, glass fiber and most recently Fibre B or Kevlar which is also enjoying considerable success in the manufacture of bullet proof modern and stylish dresswear.

A problem with increasing tire strength by increasing numbers of cords within a given number of plies or by increasing the number of plies or by increasing the thickness of plies necessitated by use of larger cords is that the tire's bulk is increased which in turn affects the tire's ability to dissipate heat which in turn adversely affects the tire's durability. So increasing a tire's strength by these cited conventional means is not always the only answer to increasing a tire's durability.

This brings into focus the other major property of a tire—its elasticity. If a tire cannot be made strong enough by continuously beefing up its strength by one or more of the means enumerated, permitting the tire to roll over a surface protrusion without breaking, then possibly the tire can be made to envelop the same protrusion by making the tire more elastic. Rubber in itself is noted for its elasticity, but a rubber's strength and modulus alone are inadequate to contain the air supporting the load without the stiffening reinforcement imparted by tire cord. To improve tire elasticity and fatigue resistance which is broadly synonymous with tire durability, tire cords were given a twist which made them resemble miniature coil springs.

Tire cord consists of a number of very small filaments of cord material where the diameter of the filaments is roughly 001″ but varies from material to material. The filament is the smallest component of cord that has the appearance of length. From 25 to 600 of these small filaments are extruded and twisted about the bundle axis to form a yarn. Two or three yarns in turn are twisted together to form the cord. The twist of the yarn or ply is usually about the same magnitude as the final cord twist but is in the opposite direction, the yarn bundles are twisted in the opposite direction which in effect untwists the yarn bundle so that the yarn bundle has little or no twist in the final cord. The direction or twist of tire cords is referred to as being either Z or S twist which means simply that the direction of twist with respect to the axis of the cord is in the same direction as the cross member of the letters Z or S. Thus, in a cord, the yarn might be given a Z twist and the cord an S twist. Tire yarns and cords are given twist to improve the cords fatigue and elastic characteristics when used to reinforce a tire. Generally, an increase in cord fatigue life, brought about by greater twist, is offset by a reduction in cord tensile. The designation 840/140/2 for a tire cord simply means that the yarn has a denier of 840, that there are 140 filaments per yarn bundle, and there are two ply yarns per cord. Ofttimes the second number is omitted from a tire's cords' designation. The designation 12S×12Z coupled with a 1260/2 means 12 twists per inch for S turns in the yarn bundle and 12 turns per inch for Z turns of the two yarn bundles in the cord cable made from 1260 denier filaments.

Thus, tire strength and durability as reflected by the tire's elasticity and strength has traditionally been closely allied to cord type as well as mechanical arrangement of individual elements. The two factors of tire strength and elasticity in essence resemble the square woven fabric whose warp and woof were inextricably intertwined until they were separated into their individual components of a warp ply of individual parallel aligned cords and a woof ply of identical cords in a mirror image to the warp ply.

Attempts have been made to combine radial and biased plies into a single tire structure. The attempts universally have been accompanied by various expedients directed towards maintaining straight curvilinear cord paths. However, if it were possible to take all of the desirable attributes of a biased constructed tire while minimizing its bad features, and add them to the desirable features of a radial ply tire, while minimizing the radial ply tires' drawbacks, the resultant hypothetical tire would indeed be an astounding new item of commerce. It would outperform other tires in all sorts of different driving conditions. The tire would be structurally stronger because of the interlaced crisscross cord paths of the various ply constructions. Vehicle performance, tire mileage, and overall operating safety would be improved in such a tire construction.

While it is technically possible it is commercially impractical to produce a tire of mixed biased and radial ply construction wherein the cord paths of both the radial and biased ply cords follow along the axial centerline of the perfectly aligned theoretical cord paths. This is especially so when the fabrication is carried out on conventional bias tire building drums.

Therefore, should it become practical to incorporate a mixed biased and radial ply construction into a tire which could be built on existing bias tire building drums and vulcanized by utilizing available bias tire vulcanizing equipment, such an expedient would be desirable. Such a desirable goal would be especially meritorious if the resulting tire structure offered novel improvements over present known tires or over the anticipated combination of tire properties referred to above.

2. Description of the Prior Art

| | | |
|---|---|---|
| 1. | Ehle | 1,364,870 |
| 2. | Kraft | 2,179,374 |
| 3. | Darrow | 2,703,128 |
| 4. | Beckadolph | 2,976,905 |
| 5. | Kraft | 3,108,628 |
| 6. | Manchetti et al | 3,165,138 |
| 7. | Massoubre | 3,231,000 |
| 8. | Kovac et al | 3,217,778 |
| 9. | Bridge Jr. | 3,419,059 |
| 10. | Mirtain | 3,442,315 |
| 11. | Duduk | 3,672,423 |
| 12. | Curtis Jr. | 3,780,783 |
| 13. | Cooper & Brierly | British Patent 730,878 |
| 14. | Rushen | British Patent 251,206 |
| 15. | Continental | British Patent 1,206,528 |
| 16. | Berringer | 3,402,752 |
| 17. | Zimmerman | 3,393,252 |
| 18. | Trevaskis | British Patent 814,248 |
| 19. | Dunlop | French Patent 1,303,287 |
| 20. | Vittorelli | 2,990,870 |
| 21. | Beckadolph | 2,986,191 |
| 22. | Dunlop | French Patent 1,445,693 |
| 23. | Beckadolph | German Patent 1,073,331 |
| 24. | Mirtain | 3,363,660 |
| 25. | Mirtain | 3,242,968 |
| 26. | Jacobs | 3,068,926 |

Kraft (U.S. Pat. No. 2,179,374) recognized the need for a tire with increased elasticity which would have the capability of enveloping rather than rolling over a protruding object in a roadway, and his solution was to mechanically orient the otherwise parallel tire cords into a sine curve form by alternately bending them back and forth during or after the calendering operation but before cutting such cords at a bias angle and building them into his tire. All plies of his tire utilized the substantially uniform sine wave cord configuration.

Kovac (U.S. Pat. No. 3,217,778) sought to achieve increased tire elasticity by purposefully bending or deforming the individual fibers or groups of fibers from their original straight or extruded configuration and heat setting them in their crimped deformed configuration. Kovac, as did Kraft, utilized the novel cord deformed configuration in all plies of his tire.

But neither the Kraft nor Kovac tires were commercial successes, and it is only possible to speculate that their lack of success may be or probably was associated with their tires' inability to maintain a given size. The elasticity of these tires no doubt had indeed been considerably enhanced but alone with the enhanced elasticity came excessive tire growth.

Ehle (U.S. Pat. No. 1,364,870) fabricated the first tire of mixed bias-radial construction in 1919 when tires were still being built on mandrels or cores. All of Ehle's plies were carefully arranged so that all cords were at or nearly at equal tension with said cords of both bias and radial plies being fastened to the steel beads on either side of the tire by ingenious use of special fabric wings to bind together longitudinally the edges of the different cord layers.

Darrow (U.S. Pat. No. 2,703,128) built a mixed tire of radial and bias plies in 1950 and states as a main purpose for his tire the increased strength, especially bursting strength, coupled with lower cost due to use of a lesser amount of cord material as main reasons for his tire. Darrow further notes that "the straight across cords would require a drum several inches narrower than bias cords . . . " but proceeded to build his tire at the narrower drum setting required for the radial tire and compensated for the wider drum setting required by the bias plies by cutting each bias ply the appropriate width required for the particular sized tire he was building with an additional 2" to 2½", and he then proceeded to cut each ply in two and to lap them in the middle on the building drum. During the tire shaping operation the lap of bias plies slipped so that while the original lap before tire shaping was 2½", after shaping the lap was reduced to ¾" in the finished tire. Darrows stated reason for ensuring that all cords, both bias and radial, were straight curvilinear was to minimize compressive stresses within any cords in order that tire durability not be adversely affected.

Technical literature on tires contains many references pointing out the very bad effects upon tire durability of putting tire cords in compression.

Cooper and Brierly (British Pat. No. 730,878) similarly built a tire of mixed radial and bias cords in 1953 and went to great pains to build the bias portion of the tire body separately from the radial portion of the tire body, anchoring each type cord to separate beads then putting the radial tire body cords atop the bias body cords and adding a tread wearing compound thereto, all in order presumably to ensure all cords' being under similar tension and none being under compression.

Kraft (U.S. Pat. No. 3,108,628) in 1959 built a mixed ply type tire similar to Darrow's and sidestepped the problem of different drum widths' being required by the respective bias and radial cords by first applying the radial cords to the building drum, ingeniously fastening the bias plies to the beads while leaving the bias plies themselves to either side of the tire building drum, then partially expanding or shaping the tire by use of a special feature of his building drum, then folding up the bias plies on either side, lapping them in the crown, applying the tread and sidewall rubber, and then completing the shaping of the tire depending upon less slippage at the top splice than did Darrow. Kraft in his mixed ply bias-radial ply tire took pains to avoid the introduction of the sine wave mechanically shaped cords of his previous invention (U.S. Pat. No. 2,179,374) although it might have been logically deduced that the radial ply cords would have been compressed and possibly to have assumed a sine wave form if he had built his tire on an ordinary bias tire building machine instead of the special machine he employed.

Ehle, Darrow, Cooper and Brierly, and Kraft were all concerned with the tires cords' being "straight" because of the commonly held technical belief that any non-straight cords within a tire result in loss of tire durability. Patentee's own U.S. Pat. No. 3,807,475 has devised a means for eliminating curvy wavy cord paths in order to improve tire durability.

Duduk (U.S. Pat. No. 3,672,423) has also prepared a mixed radial-bias ply tire and as had been done by each of the cited inventors above, utilized means to ensure that all cords would be straight curvilinear. Duduk states "it is a further object of this invention to provide a radial ply tire which can be manufactured in accordance with standard U.S. techniques for manufacturing conventional bias ply tires." Duduk, probably knowing that the building drum width would be greater for his mixed radial-bias tire than required for a straight radial tire thereby resulting in a surplus length of the radially oriented cords, utilized two means to ensure an essentially straight radial cord. One means which he used was to employ a tire cord (nylon) specially heat treated and stretched so that the cord would have high thermal shrinkage, and he specifies "the preferred thermal shrinkage at 190° C. of both plies is approximately 17 percent (12 tpi)." Thus when his tire heated up during vulcanization, the cords would shrink thereby assuring essentially straight curvilinear cord paths. To further ensure straight cord paths, he anchored the radially oriented cords to both beads so as not to lose the beneficial effect of the thermal shrinkage. The preferred thermal shrinkage of 17 percent cited corresponds closely to the excess length of the radial cords over that required for a radial tire of the same size.

Manchetti (U.S. Pat. No. 3,165,138) describes a tire of mixed bias-radial construction wherein the radial cords are tied to the beads and which contains one bias ply tied to one bead and located inwardly of the radial plies. The purpose of the bias ply was to prohibit the radial cords from pulling through the liner compound, and the reason for anchoring only one bead was to ensure all the cords' being essentially straight curvilinear.

Mirtain's (U.S. Pat. No. 3,442,315) tire is similar to Manchetti's but his objective was to control resonant frequencies set up by the tire and vehicle system.

French Pat. No. 1,445,693 describes a tire having a radial inner ply and low crown angle outer bias plies with the bias oriented cords stretched so as to avoid undulations.

Travaskis (British Pat. No. 814,248) describes an ingenious tire with an inward radial ply and outward bias plies wherein the outward bias cords are specially wound onto the inflated unvulcanized radial ply. The technique employed ensured all cords being straight curvilinear and in equal tension.

French Pat. No. 1,303,287 describes an extremely highspeed tire capable of withstanding speeds of 350 rm/hr or greater containing a reinforcing cord ply buried in the tread rubber with the cords in one tire embodiment being radially disposed. The cords lie just below the groove bottoms and extend into the tread ribs in an undulating path corresponding to the tread design of ribs and grooves. The purpose of the cord ply was to help hold the tread and tire sidwall to the cord body of the tire to help resist against the high centrifugal forces generated at the extremely high speeds.

Massoubre (U.S. Pat. No. 3,231,000), Mirtain (U.S. Pat. No. 3,242,965), Beckadolph (U.S. Pat. No. 2,986,191), and Vittorelli (U.S. Pat. No. 2,990,870) were all concerned with utilizing cords of different chemical composition or size, including control of cord angles, to give tires of improved properties. Vittorelli arranged his cords so as to have a decreasing cord modulus from the inner to outer plies with all cords being at the same angles. Beckadolph (German Pat. No. 1,073,331) utilized rubber compounds of different modulus to build an improved tire. Mirtain (U.S. Pat. No. 3,363,660) utilized cords of different stretchabilities to build an improved tire.

Zimmerman (U.S. Pat. No. 3,393,252), Bridge (U.S. Pat. No. 3,419,059), and Berringer (U.S. Pat. No. 3,402,752) describe cord technology developments in composition, twist, heat tensilizing, etc. that resulted in better tire performance.

Curtis (U.S. Pat. No. 3,780,783) describes a three ply tire "in which the cords in two of the plies follow a geodetic cord path and the cords in the third ply follow a conventional path. The individual cords in all of the plies are of the same length and each ply has its radially inner ends turned about the respective bead core."

British Pat. No. 1,206,528 describes a radial tire whose radially oriented body cords are tied to the beads, and having a belt of inextensible cords extending around the tire wherein the radial cords located directly beneath "the belt are formed with undulations to render said part of the carcass substantially free of tension. In practice the maximum amplitude of the undulations ranged between one and three times the thickness of the radial carcass cords."

Beckadolph (U.S. Pat. No. 2,976,905), Jacobs (U.S. Pat. No. 3,068,926), and Rushen (British Pat. No. 251,206) describe the state of the art of various tire developments at various times during the past half century.

All of these cited inventors were united in a common bond in the thrust of their individual inventions to create improved pneumatic tires. They were essentially concerned with controlling and maintaining straight curvilinear cord paths and with controlling some intangible within the tire through use of modulus variation and cord extensibility or stretchability since these were the accepted criteria as the means of achieving their common objective of improved tires.

THE INVENTION

The shortest distance from bead toe to bead toe along the tires' inner periphery is referred to by tire design engineers as the inner peripheral dimension (I.P.D.). It is known to these same engineers that the building drum width required for any given sized tire depends upon the final desired crown cord angle, the bias cutting angle, lift ratio, and cord stretch. Thus no single drum width is suitable for both bias and radially oriented cord tires of the same size and inner peripheral dimension. The drum width required for building a radially oriented tire body is ideally the inner peripheral dimension less some constant dimension to account for the ledge heights at the drum ends against which the steel beads are pressed when building the tire. The ledge heights for a conventional building drum is the building drum diameter minus the bead diameter divided by two. The inner peripheral dimension defines basically the size of the tire and the volume of inflating gas that the tire will hold.

However, when building a bias ply tire, a wider building drum width is required than is dictated by the tires inner peripheral dimension and the building drum width has to be progressively widened as the cord angle with the equatorial line of the tire decreases.

The relationship between the desired crown cord angle, bias cutting angle, lift ratio, and cord stretch is given in the formula below:

$$\text{cosine crown angle} = \frac{\text{cosine cutting angle} \times \text{lift ratio}}{1 + \text{cord stretch}}$$

The lift ratio is determined by the size of the building drum and the section height of the final desired tire. The building drum width required for a particular sized tire becomes a matter of trial and error. If the drum width selected is too narrow, tire cords are stretched more to achieve the desired tire size and such a tire is known as a "tight tire". Conversely if the drum width is too wide, a "loose" tire results. The industry traditionally has favored "tight" over "loose" tires for tire durability as well as for economic reasons. The original pneumatic tires built on mandrels or cores had no lift to them at all hence these tires were very "loose". The earliest bias tires used drums having a diameter substantially larger than the bead diameter, which of necessity resulted in loose tires since lifting was minimal. With passage of time, drum building diameters decreased with respect to the tire bead diameter finally reaching and actually becoming even smaller than the bead diameter with some equipment manufacturers, thereby resulting in higher lift ratios and "tighter" tires. As a generality, the greater the lift ratio, the lower is the bias cutting angle and the wider the drum setting required. "Tight" tires result in straight curvilinear cords while "loose" tires whose cords are also straight curvilinear are more prone to have portions of the cord structure with undulations being evident. Such cord undulations interspersed in with otherwise straight curvilinear cords result in poor tire durability. "Loose" tires with straight curvilinear cords have greater enveloping characteristics than "tight" tires which tend to roll over protrusions rather than enveloping them. The inadvertent and undesirable presence of cord undulations in a tire with otherwise straight curvilinear cords has been a major motivating reason for going to "tighter" tires over the years. The designation "tight" to describe a tire carries with it the connotation of increased strength and toughness, hence having greater durability, while the adjective "loose" connotes softer riding with an enhanced property of envelopment of protrusions on the roadway surface, coupled with lower tire strength and toughness.

A 15" bead diameter bias tire having an inner peripheral dimension of 18½" and employing a 16" diameter building drum set at a width of 21" resulted in a tire having a 33° crown angle when using polyester tire cords cut at a 30° bias angle. Thus the bead toe to bead toe dimension on the building drum was approximately 22", which 22" length shrinks 16 percent in the process of lofting or shaping of the tire from open ended barrel to final toroidal shape to achieve the IPD of 18½". This shrinkage in the inner peripheral dimension does not result in a shrinkage along the linear axis of the tire cords but instead represents a change in the lattice structure of the cross-laid plies resulting when the tire is lofted. The change in cord angles at various places in the tire from the 60° laid angle (a 30° bias cut angle) is as shown:

|  | Ply 1 | Ply 2 |
|---|---|---|
| As laid on drum | 60° | 60° |
| Lower sidewall | 49° | 50° |
| Midsidewall | 42° | 48° |
| Upper buttress | 34½° | 39° |
| Shoulder | 32° | 38° |
| Crown -- 1 | 34° | 34° |
| Crown -- 2 | 34° | 31° |
| Shoulder | 37° | 42° |
| Upper buttress | 43⅜° | 45⅜° |
| Midsidewall | 45° | 51° |
| Lower sidewall | 47⅜° | 49⅜° |

As the angle changes from 60° as laid on the building drum to 34° as measured in the tire crown (the angle made by the cord with the equatorial line of the tire) the cords are physically pulled closer together and the inner peripheral dimension shrinkage from 22" to 18½" reflects this pulling together of the cords. The tire thus described has the desired "tightness" as judged by the tire engineer responsible for the tires adequacy.

Now, however, if two additional laid plies were to be placed atop the two plies described thus far and if these additional cross-laid plies were cut at a 20° bias angle instead of the 30° angle characterizing the first two plies, the building drum width of 21" is too wide for these additional plies for the given sized tire that is being fabricated. In short, the building drum width of 21" could result in a much larger cross section tire from the 20° bias cut cords while having the same "tightness", than is possible from the 30° bias cut cords, but since the tire size and cord "tightness" is regulated by the 30° bias cut plies, the two added plies cut at a bias angle of 20° are considerably "looser" than the 30° bias cut cords. This "looseness" is reflected by a lesser movement of the cord resulting in smaller angle changes than is reflected in the measured angle data reported above. Added ply cords 3 and 4 being looser than cords of plies 1 and 2 impart a greater enveloping property to the tire as a consequence, while ply cords of plies 1 and 2 control the tire size. As the bias cutting angle is reduced to 0° for plies 3 and 4, the cord now extends radially across the tire and from bead toe to bead toe (should the radial cords be so applied to the tire on the building drum) the radial cords have an excess length of 3½" (22"–18½") which must be taken up by direct compression during the tire shaping. The compression is absorbed by the cord by two essential means (1) the twist of the cord cable is visually seen to increase and in extreme cases is seen to increase from 10 to 11 cables per centimeter to as high as 18 cables per centimeter in short segments and (2) by erupting from a straight curvilinear line to assume an irregular sawtooth configuration with the sawtooth eruptions extending both circumferentially and radially from the laid path. Compression as great as 60 percent has been observed in short lengths of cord. The zigzag sawtooth cord paths appear to start forming at about 20 percent compression for the cord and twist used in the subject experiment. Cords having high twist initially would assume a sawtooth path at lower measured compression than cords having lower twist.

Cord compression in cords subject to compression is not uniform from cord end to cord end but is controlled and regulated by the angle change of the bias plies underneath. For low angle changes in the lower sidewall area, cord compression of 0° bias cut cord (radially oriented) ranges from 0.3 to 1.0 percent per 1° of cord angle change as laid on the building drum. From the midsidewall to upper buttress, compression ranges from 1.0 to 1.2 percent per 1° angle change and in the shoulder and crown area compression ranges from 1.2 to 1.5 percent per 1° of angle change. Compression of cord cut at bias angles less than the bias cut angle of the underlying bias plies but not reaching 0° gradually decreases from the values enumerated above to very little compression when laid atop cross plies cut at 30° with the magnitude of the change being dictated by the differences in the bias cutting angles. Listed below are measured cord compressions of radially oriented cords laid atop two bias plies cut at a 30° cutting angle and expanded to give a 33° crown angle.

| | |
|---|---|
| Bead to midsidewall | 3.8% compression |
| Midsidewall to lower buttress | 16.5% compression |
| Lower to upper buttress | 19.3% compression |
| Upper buttress to shoulder groove | 34.2% compression |
| Shoulder groove to shoulder groove | 32.4% compression |

In addition to regulating cord compression by controlling the bias cutting angle, compression may also be controlled by partially preforming the first laid bias plies before adding additional plies to the tire body. The degree of cord compression is then regulated in the extent of lift of the first laid plies before the laying on of the added plies. The type of cord compression, i.e. increased twist per unit length while still maintaining a straight curvilinear cord path, or the assumption of the waving undulation changing to sharp zigzag sawtooth configuration may be further controlled by the twist of the cord being used. In conventional tire cords as currently commercially available, the zig-zag configuration appears to be regulated by the weak pick cords which serve as anchor points with the eruption of the cord occuring generally midway between the picks.

Applicants invention may be defined simply as the mating or joining together into a single tire, separate tires having different and specific "tightness" or "looseness" characteristics. This expedient provides a new and unusual tire of unexpected structure and performance characteristics. The bringing together of these divergent tire structures provides and constitutes a new process of manufacture.

SUMMARY OF THE INVENTION

This invention relates to a class of tires, and more specifically to a pneumatic tire comprised of a tire body of annular configuration and substantially U-shaped cross section having a pair of inner annular edge portions with at least one bead embedded therein and circumferentially extending about the tire in parallel concentric relationship respective to the equatorial plane of the tire. The minimum and extreme ply construction of this invention is comprised of at least one radial and two oppositely biased plies which jointly support a tread wearing compound disposed within the equatorial plane of the designated tire.

The cords of each of the biased plies extend from a bead on one side to a bead located on the opposed side of the tire and warp conventionally around the beads, so that the biased plies are tied or firmly anchored to the beads and partially support the tread wearing compound.

The radial ply which has been altered by compression during the tire shaping has circumferentially extending marginal edge portions disposed parallel to the beads and to the equatorial plane of the tire with the cords of the compressed radial ply being continuous from edge portion to edge portion thereof. The marginal edge portions of the radial ply may extend from the tire shoulder to and even extending about the bead at the tire designer's discretion and the cords thereof may be characterized with a zig-zag sawtooth cord path respective to an idealized conventional radial cord path, with the greatest amplitude or irregularity occurring in the crown and shoulder of the tire, and wasting away to naught near the opposed edges thereof when terminating at the bead.

The location of the compressed radial ply, together with the novel configuration and disposition of the individual cords thereof, provide an improved tire construction which is lighter and stronger, more elastic, and therefore, more durable when encountering road hazards, and which enables a method of manufacture to be enjoyed which has heretofore been unobserved to those skilled in the art. The designated tire furthermore imparts improved handling characteristics into a vehicle which it may support and can be fabricated inexpensively.

Accordingly, a primary object of this invention is the provision of a hybrid tire comprised of a mixed radial and biased ply construction wherein the radial ply in the shaped and vulcanized tire is of lesser width than as laid on the building drum.

Another object of the invention is to provide a tire of mixed ply construction which is comprised primarily of a biased ply attached to a compressed radial ply, with the cords of the latter undergoing progressively increasing compression as they move upward in the sidewall.

A further object of this invention is to disclose and provide an improved tire of mixed construction which imparts improvements into vehicle handling characteristics.

A still further object of this invention is to provide a lightweight cooler running tire having a strong elastic carcass made of both biased and compressed radial ply cords, each arranged respective to one another to improve tire life.

Another and still further object of the invention is the provision of improvements in the method of manufacturing mixed ply construction tires.

An additional object of this invention is the provision of improvements in a method of fabricating a high speed tire which includes a compressed radial and a biased ply therein.

Another object of the instant invention is to provide a new method of manufacturing a tire having both a compressed radial and a pair of pairs of biased plies therein.

A further object of the invention is to provide a modified, improved bias constructed tire wherein two of the biased plies are cut at a lesser bias cutting angle then another pair of biased plies thereby being at a larger angle with the equatorial line of the tire when laid upon the building drum so as to result in the cords of the added plies having less tension than the cords of the plies controlling the tire size.

A further object of the invention is to provide a modified, improved bias belted tire wherein the belt plies are cut at a lesser bias cutting angle than the pair of oppositely laid bias plies thereby being at a larger angle with the equatorial line of the tire when laid upon the building drum so as to result in the cords of the added belt plies having less tension than the cords of the plies controlling the tire size.

A still further object of the invention is to provide an improved truck tire of mixed bias angle construction.

Another object of the invention is to provide an improved truck tire of mixed bias-radial cord construction.

Another object of the invention is to provide an improved airplane tire of mixed bias angle construction.

A still further object of the invention is to provide an improved airplane tire of mixed bias-radial construction.

An object of the invention is to provide an improved earthmover tire of mixed bias angle construction.

Another object of the invention is to provide an improved earthmover tire of mixed bias-radial cord construction.

Another object of the invention is to provide a tire having plies of cords having different degrees of tightness or looseness thereby creating a tire having both greater elasticity and greater strength.

Another object of the invention is to provide a means of compressing a cord within a tire during the process of tire shaping in order to improve the tires elasticity without having to resort to mechanical or chemical means of achieving the compression.

An object of the invention is to provide a stronger tire having less mass than conventional bias, bias belted, and radial tires.

A still further object of the invention is to provide a tire with greater strength and stiffness thereby permitting a lower inflation pressure than possible with conventional tires.

The above objects are attained in accordance with the present invention by the provision of a combination of elements to improve tire handling and life and an improved method of manufacture in a manner substantially as described in the above abstract and summary.

These and various other objects and advantages of the invention will become readily apparent to those skilled in the art upon reading the following detailed description and claims and by referring to the accompanying drawings.

DESCRIPTION OF THE PREFERRED EMBODIMENTS

Throughout the various figures of the drawings, wherever it is practical or logical to do so, like or similar numerals will refer to like or similar elements.

Figure 1:
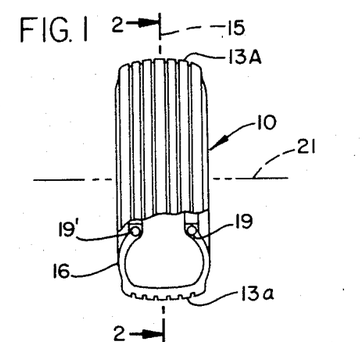
FIG. 1 is an end view of a pneumatic tire, having some parts thereof removed and some of the remaining parts shown in cross section.
Figure 2:
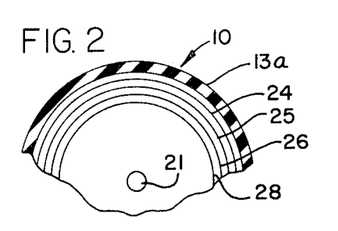
FIG. 2 is a fragmentary, cross section representation of a tire as may be taken along line 2—2 of FIG. 1.
Figure 11:
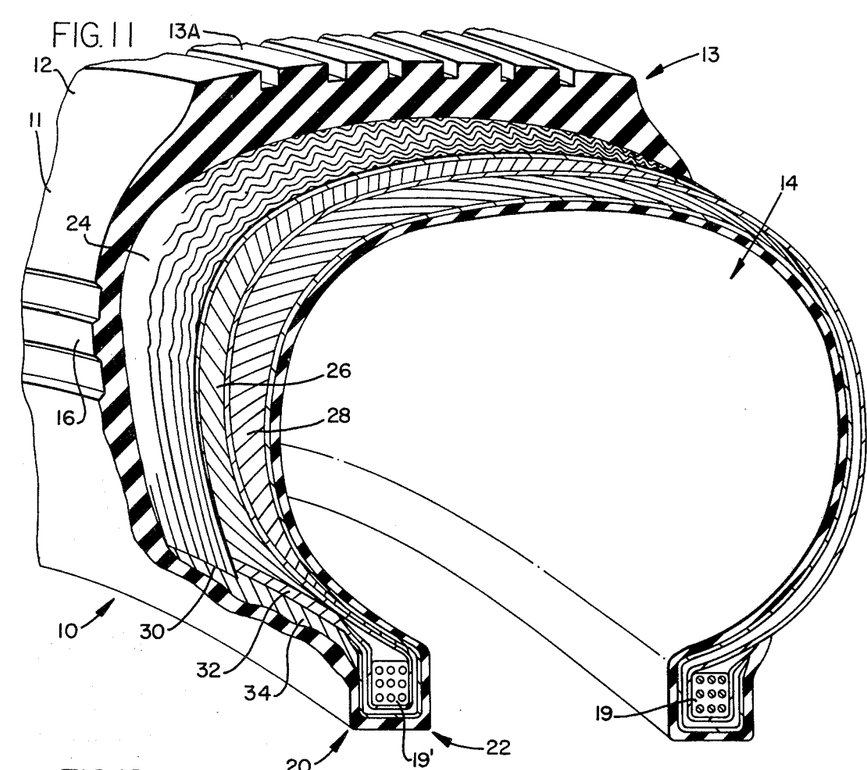
FIG. 11 is a broken, perspective view of a pneumatic tire made in accordance with the present invention, with some parts thereof being removed therefrom, and some of the remaining parts being shown in cross section.

FIGS. 1 and 11 of the drawings, in conjunction with various other figures, disclose a tire body 10 of annular configuration and substantially U-shaped cross section having an elastomeric compound which forms a sidewall 11, a buttress 12, a shoulder 13, and tread portion 13a thereof. The air chamber, or interior 14 of the tire, is encompassed by and opposed to the tread. The tread circumferentially extends about the tire and is normally arranged to be bisected by the imaginary equatorial plane 15 thereof. A scuff rib 16 is optionally provided at the point of maximum protection for the tire sidewall when the tire scuffs against a curbstone. Spaced bead portions 19 and 19' are embedded within the spaced inner annular edge portions thereof. The rotating central axis of the tire is seen to lay along line 21.

Figure 14:
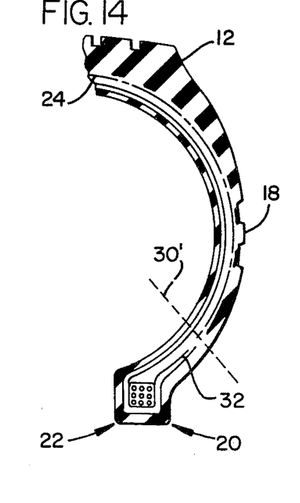

As best seen in the embodiment of FIGS. 11 and 14, each of the spaced inner annular edge portions form a heel 20 and a toe 22, which could just as well perhaps be defined as the lowermost part of the outermost and innermost bead portions.

In its simplest and most extreme form, the present invention comprises a pneumatic tire having at least three plies, one of which must be an outer high angle ply 24, while the other two remaining plies 26 and 28 must be of biased construction, and must be positioned inwardly of the ply 24.

Figure 3:
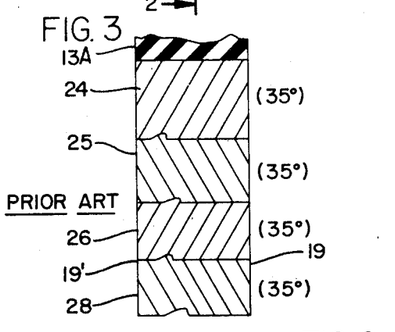
FIG. 3 is a hypothetical cross sectional representation of a prior art pneumatic tire.

In FIG. 3 there is disclosed a fragment of a prior art four-ply biased constructed tire, wherein a bead 19 is located within each of the inner annular edge portions of the tire, with two pairs of cross-layed bias constructed plies 24, 25, 26, and 28 being variously brought more than 180° or up to 360° about the bead and terminated in spaced relation so that a step-down configuration is imparted into each of the opposed marginal edge portions of the plies. Hence, FIG. 3 is said to have two pairs of cross-layed biased constructed plies which outwardly lap about a pair of opposed beads and are layed back onto one another with the marginal edge portions thereof being arranged in overlapping configuration. This terminology prevails herein regardless of the actual measurements one may be able to enjoy respective to the path of the ply fabric about the bead.

Figure 4:
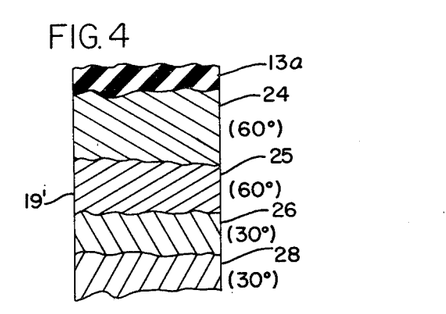
FIG. 4 is a diagrammatical representation which discloses a part of the interior of a tire made in accordance with the present invention.

In FIG. 4 an innermost ply 28 is positioned adjacent to an oppositely biased ply 26 with the two plies forming a ply construction and underlying plies 24 and 25. Plies 26 and 28 lie at an angle of 30° respective to the equatorial plane of the tire. Ply 24 is the outermost ply and is oppositely biased respective to ply 25. Plies 24 and 25 lie at 60° respective to the equatorial plane of the tire. The ply pair 24 and 25 represents the outermost ply construction and is biased respective to the equatorial plane at an angle which is greater than the pair of plies 26 and 28.

Figure 5:
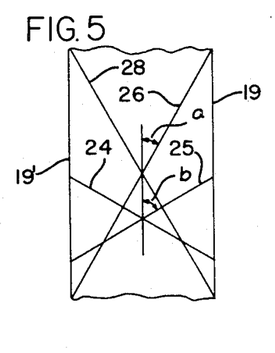
FIGS. 5–10 are part schematical, part diagrammatical representations of various different embodiments of a pneumatic tire made in accordance with the present invention.

FIG. 5 is a hypothetical reproduction of FIG. 4 and schematically discloses the relationship found between the cord paths of plies 24, 25, 26, and 28 respective to the equatorial plane of the tire. The innermost ply pair 26 and 28 form the indicated angle alpha respective to the equaltorial plane while ply pairs 24 and 25 form the indicated angle beta respective to the equatorial plane of the tire. Throughout the present invention the angle beta will be greater than the angle alpha.

Figure 6:
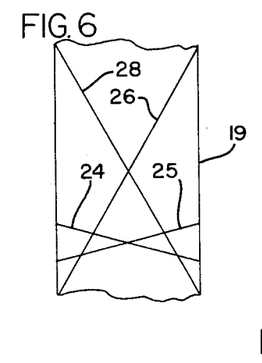

FIG. 6 discloses an innermost ply construction comprised of cords 26 and 28 which may be related to the plies 26 and 28 of FIGS. 3 and 4. The cords of ply 24 and 25 lie at still a greater angle beta respective to the equatorial plane of the tire when compared to the high angle cords of FIG. 5.

Figure 7:
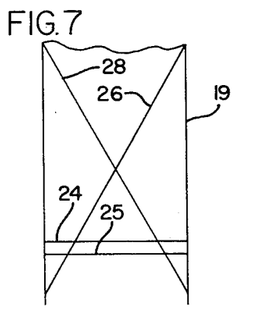

In FIG. 7 the cords of the innermost ply pair 26 and 28 remain at an angle alpha at 30°, while the cords of plies 24 and 25 have been arranged at 90° respective to the equatorial plane of the tire and accordingly, cords 24 and 25 have been resolved into an angle which constitutes a radial ply.

In FIGS. 3–7 it will be noted that the outermost cords have been progressively increased in angular disposition respective to the equatorial plane of the tire as one progresses from FIG. 3 to FIG. 7. In the first embodiment seen in FIG. 4, the relative angle between the innermost and outermost ply construction is relatively small as compared to the embodiment of FIG. 7.

Figure 8:
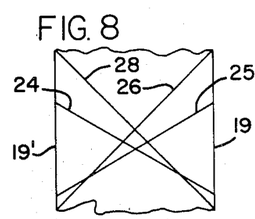
Figure 9:
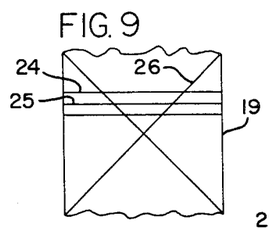
Figure 10:
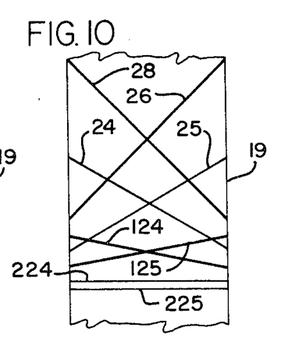

In FIGS. 8–10, the innermost pair of biased plies 26 and 28 are illustrated as being at a 45° angle respective to the equatorial plane of the tire, and arranged 90° respective to one another.

In the specific embodiment of FIG. 8, the outermost pair of plies 24, 25 lie at an increased angle with respect to the equatorial plane and to the innermost pair of plies. Plies 24 and 25 lie at 60° respective to the equatorial plane, while plies 26 and 28 are disposed at 45° thereto.

FIG. 9 illustrates the result of further increasing the angular disposition of plies 24 and 25 into the 90° position respective to the equatorial plane, and 45° respective to the innermost plies 26 and 28. It should be understood, as exemplified in the foregoing FIGS. 3–7, that plies 24 and 25 can be arranged at an infinite number of different positions respective to the angle formed between the cords 24 and 25, or to the equatorial plane.

In the embodiment of FIG. 10, two additional pairs of plies 124 and 125' and, 224 and 225; have been added to the tire structure. The innermost plies 26 and 28 lie at 45° alpha, plies 24 and 25 lie at 60° beta, plies 124 and 125 lie at an angle which is greater than 60° respective to the equatorial plane, while the outermost cords, 224 and 225, lie 90° respective to the equatorial plane. Hence, beginning with the cords of the innermost pair of plies it will be noted that as one progresses through the various cross-laid cords of the various ply structure, that the angle formed between the cords and the equatorial plane increase as one progresses toward the tread wearing surface. In this particular instance, as illustrated in the embodiment of FIG. 10, the cords of the innermost pair of biased plies are arbitrarily illustrated lying at 45° while the cords of the outermost ply or plies lie normal to the equatorial plane, and the cords of the plies interposed therebetween lie at various different angles which sequentially increase as one moves outwardly toward the tread surface.

Moreover, the cords 26 and 28 may be arranged at angles other than the 45° angle illustrated herein so long as the overlying or superimposed cords of the adjacent or outermost ply construction are arranged at still a greater angle respective to the innermost ply construction.

Looking again now to FIG. 11, which illustrates one form of the present invention, wherein the outermost ply construction is brought down into proximity to the spaced beads, it will be noted in this particular embodiment that the radial ply 24 has an edge portion 30 spaced from each of the beads 19. The individual cord paths of the radial ply commences at edge portion 30. The cord path is substantially a straight line and lies more or less normal to the equatorial plane of the tire. As one progresses past the skuff rib 16 in the midsidewall, the cord path is seen to assume a slightly irregular configuration which increases in amplitude and frequency in a progressive manner until a maximum amplitude and frequency imparts a zig-zag sawtooth configuration into the cord at the buttress with this waviform extending into the mid-portion of the crown. The configuration of the individual cords 24 is best appreciated from the illustrations set forth in FIGS. 27 and 28.

Figure 12:
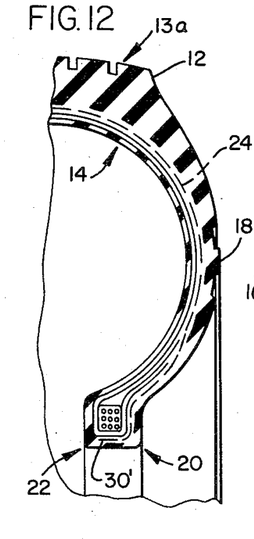
FIGS. 12–16 are fragmentary cross-sectional representations of various embodiments of a tire made in accordance with the present invention.

In the embodiment of FIG. 12, the radial ply 24 has an edge portion 30' which terminates at the toe 22 and is seen to be disposed in underlying relationship respective to the bead bundle. Ply 24 generically need only be at a higher angle than plies 26 and 28.

Figure 13:
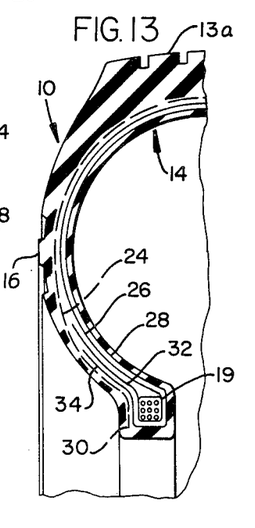

In the embodiment of FIG. 13, the edge portion 30 of the radial or higher angle cord terminates in close proximity of the lower portion of the bead bundle commonly referred to as the bead heel.

In the embodiment of FIG. 14, the edge portion of the radial or higher angle ply terminates in proximity to the dot-dashed line indicated by the numeral 30'. The edge of the cord is located between the bead bundle and the scuff rib 18.

Figure 15:
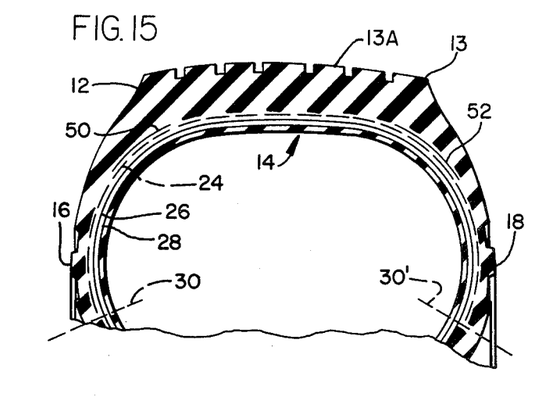

In the embodiment of FIG. 15, the radial or higher angle ply terminates slightly below the scuff rib 18.

Figure 16:
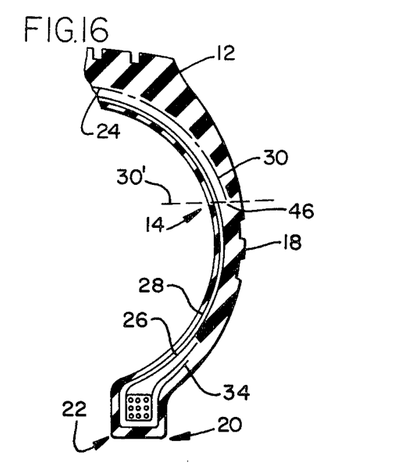

In the embodiment of FIG. 16, it will be noted that the radial or higher angle ply has an edge portion positioned between the shoulder of the tire and the scuff rib 18 as seen indicated by numeral 30'. Numeral 46 indicates a position referred to as herein as "located between the upper buttress area and the midsidewall of the tire".

Figure 17:
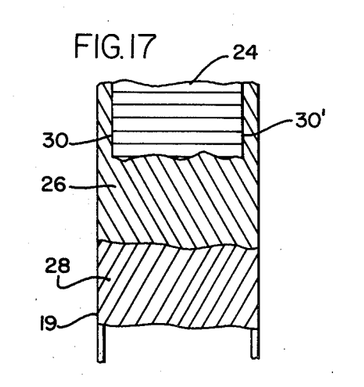
FIG. 17 is a part schematical, part diagrammatical representation of a tire structure made in accordance with the present invention.

FIG. 17 is a schematical representation of a tire made in accordance with the embodiments of FIGS. 12-16 wherein the radial or higher angle ply structure 24 has edge portion 30, 30' which terminates short of the bead bundle 19 and which are located outwardly toward the tread surface in superimposed relationship respective to the oppositely biased pair of plies 26 and 28.

Figure 18:
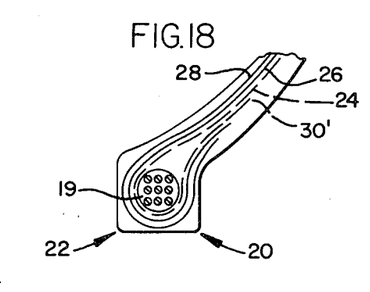
FIGS. 18–21 are fragmentary representations which set forth part of the structure of a tire made in accordance with one of the foregoing embodiments of the invention.

FIG. 18 illustrates one means by which a radial or higher angle cord ply 24 can be anchored to the spaced bead bundles by wrapping the marginal edge portion of the radial or higher angle ply about the bead bundle and extending the terminal edge portion 30' back up in an upward direction with the edge portions of the biased ply terminating short thereof to provide a stepped configuration.

Figures 19, 20:
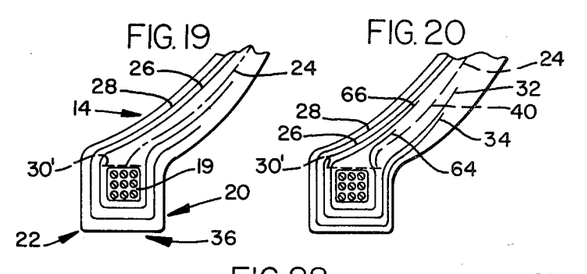
Figure 21:
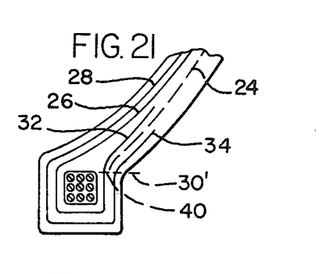

FIG. 19 illustrates a radial or higher angle ply 24 having a terminal edge 30' which terminates adjacent to a bead bundle 19, with the marginal edge portion of the radial or higher angle ply being sandwiched between the turned up marginal edge portion of the biased plies.

In the embodiment disclosed in FIGS. 12-21, the biased plies 26 and 28 are seen to be cross-layed respective to one another and are attached by wrapping the marginal edges conventionally about the spaced beads. Radial or higher angle ply 24 of this particular embodiment constitutes the outermost ply, while ply 26 is sandwiched between innermost ply 28 and the radial or higher angle outermost ply 24. Numeral 30 indicates one terminal edge portion of the radial or higher angle ply, while numeral 32 indicates the terminal edge portion of the central biased ply, and numeral 34 indicates the terminal edge portion of the innermost biased ply.

Looking again now to the details of FIG. 15, numerals 50 and 52 indicate mini-plies which preferably are arranged in accordance with the teachings of Applicant's U.S. Pat. No. 3,807,475 issued Apr. 30, 1974, and U.S. Pat. No. 3,863,696 issued on Feb. 4, 1975. This Figure shows a compressed radial or higher angle ply 24 terminating in the lower sidewall, well above the bead bundle.

FIGS. 12-21 inclusive show various embodiments of the invention wherein the compressed radial or higher angle ply is terminated at various locations between the buttress and bead areas, and where the marginal ends thereof are sandwiched between the body plies and turn-ups in various arrangements, and wherein the illustrations are limited to two biased and one compressed radial or higher angle ply. FIGS. 14, 15, and 16 show compressed radial or higher angle inserts or shortened plies that do not extend to the bead.

In FIGS. 18-21 of the drawings, each of the bead bundles are seen to form spaced rim-receiving inner annular edge portions of the tire. Numeral 30' indicates the relative location of the terminal end or opposed edge of the radial ply or higher angle outermost ply.

As exemplified in the embodiment of FIG. 20, a strip, sometimes called bead flippers, may be added within the inner annular edge portion of the tire. The marginal ends 64 and 66 of the flipper are seen to be sandwiched within and between various other plies. A number of different configurations of the relationship between the flipper and the radial or higher angle ply can be employed to advantage.

Figure 22:
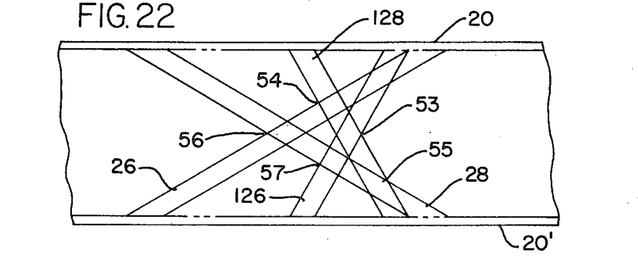
FIGS. 22 and 23 are schematical representations of the cord paths found in a pneumatic tire made in accordance with still another embodiment of this invention.

In the schematically illustrated embodiment of FIG. 22, there is disclosed a four ply tire made of two pairs of cross-laid tire fabric. The bias cut plies 26 and 28 form the one pair of plies that are firmly anchored to the steel beads, while plies 126 and 128 form an oppositely biased outermost pair of plies at angles greater than the cord angles exemplified by plies 26 and 28 and which may or may not be anchored to the beads. The plies 126 and 128 are symmetrical with respect to each other and form a shorter cord path, as measured from bead to bead, as compared to the longer cord path of the remaining oppositely biased pair of plies 26 and 28. The various geometrical FIGS. 53, 54, 55, 56 and 57 are in the form of various polygons and are formed by the various intersecting pairs of cords of each ply.

Bias cords 26 and 28 require a wider drum setting for a particular sized tire built on a specific drum diameter and having a specified crown cord angle than do cords 126 and 128 for the same specified conditions. Thus, cords 126 and 128 being too long, since they are placed on the building drum having a width specified by cords 26 and 28, must undergo compression along their linear axis while simultaneously changing angle from the angle as laid on the building drum. Cords 126 and 128 thus are under less tension than cords 26 and 28 when the tire is inflated.

Figure 23:
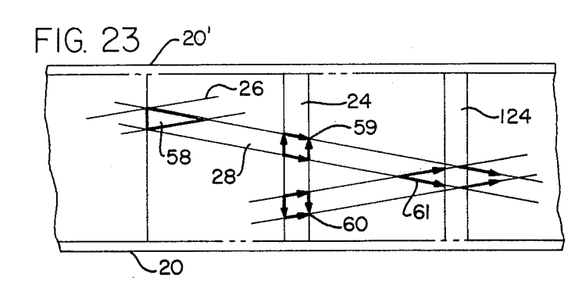

FIG. 23 is a schematical representation wherein the two oppositely biased constructed plies 26 and 28 are imposed between compressed radial plies 24 and 124 and wherein the innermost compressed radial ply may be shortened to thereby form various polygons 58, 59, 60, and 61. The direction of force which is applied to each individual cord is provided with the illustrated arrow.

Figure 24:
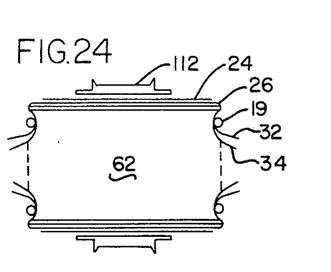
FIGS. 24 and 25 are part diagrammatical, part schematical representations of a pneumatic tire undergoing fabrication.

FIG. 24 discloses schematically a tire building drum means 62 which may take on any number of conventional means for collapsing to permit the green tire to be removed therefrom and any number of diameters with respect to the positioning of the steel bead bundle of specified diameter so as to control the tire lift ratio. Various elements of a tire are seen illustrated in mounted relationship thereto, for a purpose which will be better appreciated later on in this disclosure.

Figure 25:
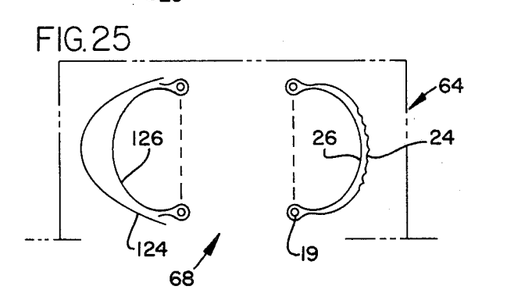

FIG. 25 illustrates the barrel-like assembly of FIG. 24 which has been expanded in the mold to form the tire into a U-shaped configuration prior to vulcanization thereof.

FIG. 25 is also symbolic of a two stage manufacture of a tire where the initial plies are laid down on a flat cylindrical building drum which is then expanded to some designated percent of the final height before application of any remaining plies or inserts.

Figure 26:
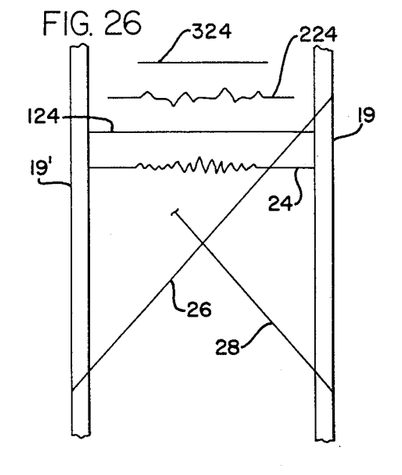
FIG. 26 is a hypothetical, schematical representation showing various degrees of compression of the radial cords found within a tire made in accordance with the present invention; and, FIGS. 27 and 28 are plan views showing both the biased and radial tire cords in the midsidewall and midcenterline of the tire depicted in FIG. 11.

In FIG. 26, the spaced beads 19 and 19' are illustrated diagrammatically as being associated with different types of radial cord paths 24, 124, 224, 324. A biased cord path is illustrated at 26 and 28.

Figure 27:
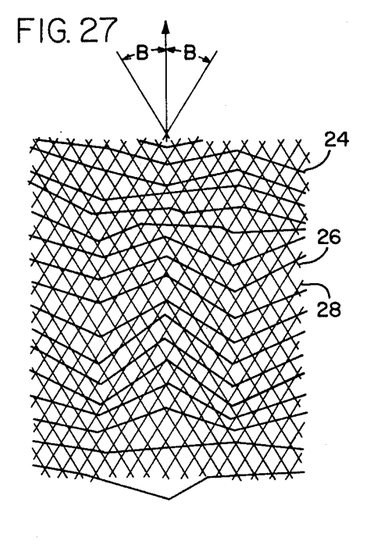
Figure 28:
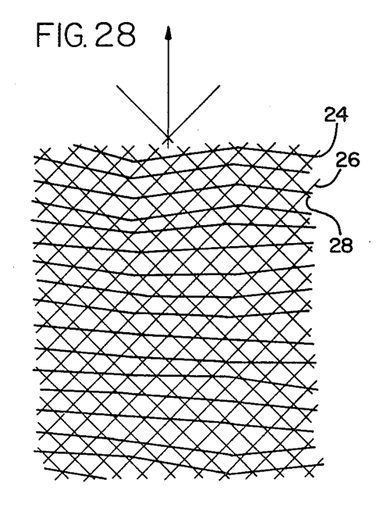

FIGS. 27 and 28, respectively, diagrammatically illustrate the cord paths found in the crown and mid-sidewall of a tire after it has been expanded into the configuration of FIGS. 11–16, for example.

In carrying out the present invention, in order to achieve the tire construction of FIG. 11 or 12, the various tire elements are arranged on a tire building drum in the manner of FIG. 24. As diagrammatically illustrated in FIG. 25, expansion of a tire from the configuration of FIG. 24 into the configuration seen in FIG. 25 will cause a biased constructed ply to assume a U-shape 26, while the radial ply will effectively assume the greater diameter U-shape configuration 24. Accordingly, the cords paths of the radial ply, which must maintain the shortest possible curvilinear straight path, assume a path 24 or 124 or variations therebetween, of 224 or 324 or variations therebetween, as seen in FIG. 26, since the actual length of the radial cords as layed on the building drum is greater than required to form the size tire which is permitted by and regulated by biased cords 26 and 28.

When biased cords 26 and 28 are subjected to the forces of shaping the tire from its original open ended drum to final toroidal configuration, they simultaneously slip and slide alongside other bias cords 26 and 28 while changing their angle paths with respect to their angle paths as laid on the building drum. The farther up the sidewall while approaching the mid or equatorial line of the tire, the greater is the angle change and slipping of cords 26 and 28 with respect to each other until at the equatorial line the maximum angle change is attained. Bias cords 26 and 28 reach an optimum point of collective angle changes which defines or controls the size of the tire as designed and specified for a particular type and size of mold and desired cord "tightness". If the lifting operation is stopped short of this point, bias cords 26 and 28 are loose with respect to each other since the expanded green tire could undergo still further expansion to accomodate a mold of a larger size but being confined to the mold of smaller tire size, said tires are apt to undergo excessive growth in service. Conversely, if the lifting operation is pushed beyond the optimum point, bias cords 26 and 28 are too tight and they will pull or strike through the inner liner compound of tubeless tires since the green tire was really too small for the mold in question but was forced to accomodate to the mold. Radial or higher angle cords 24 on the other hand are too long for the size tire being dictated by the optimum expansion point of bias cords 26 and 28 so that the radial or higher angle cords 24 must compress into a shorter linear distance from their length as laid on the building drum. The term compression as used in this specification means simply that the measured linear length of a cord within a finished tire is less than its length as originally laid on the tire building drum between any two arbitrary points. Radial or higher angle cords 24 are compressed linearly during tire shaping and when they are unable to undergo further linear compression at any time, they buckle and erupt outward and/or in the same plane to form irregular sawtooth zig-zag chevron paths as seen in FIGS. 11, 26, 27, and 28. In the vulcanized tire the radial or higher angle cords are not in an actual state of strong physical compression as exemplified by a compressed steel spring.

In summary, the method of the present invention comprises placing tire beads, elastomeric tire material 112, and the mixed plies onto a tire building drum in the illustrated manner according to FIG. 24. The various plies are superimposed upon one another in sandwiched relationship. The relationship of the radial and biased plies may be in accordance with any one of the foregoing preferred embodiments of the invention. The edge portion 30 of the radial ply may be terminated at any point between the buttress and the bead, dependent upon the degree of reinforcement and stiffness desired in the sidewall. In one embodiment of the invention, the radial or higher angle cord is never extended past the bead heel since beyond the point its presence detracts from the tire's technical and economic properties. In other embodiments of the invention, the radial or higher angle cord is wrapped partially about the bead, for example, as seen illustrated in FIGS. 12 and 18. The tire is expanded within a vulcanization mold into its final configuration as seen illustrated in FIG. 25. This action forces the cord paths to assume the illustrated relationship set forth in FIGS. 11 and 26–28.

A radial ply of the unexpanded tire, in most instances, will have a resultant theoretical length approximately 20% longer than the corresponding inner peripheral dimension after the tire has been lifted to its final toroidal shape as illustrated in FIG. 25, and therefore, in order for all the plies to be arranged in a contiguous manner along a common curvilinear plane, it is necessary for the individual cords of the resultant longer radial ply to be compressed sufficiently whereby they accomodate themselves to the shorter distance by undergoing linear compression coupled with buckling which occurs when the cords can no longer accept further linear compression at which point they deviate from the straight radial path to a zig-zag irregular path as illustrated in the figures of the drawings. Once the radial cords have been compressed during the tire shaping operation they relax and accomodate to their new configuration. This desirable expedient, when the tire is inflated, places the individual cords of the compressed radial ply under very low tension respective to the cords of the biased ply; and at the same time, the individual radial cords tie together each other and each of the intersecting biased cords. This structural feature is best appreciated by viewing FIG. 11 in conjunction with FIGS. 26–28. In general, compression is minimal at or near the steel bead, gradually increasing up the sidewall, reaching its maximum at the shoulder, and diminishing slightly towards the centerline.

The present invention provides a hybrid tire wherein the biased cords retain their axial alignment or longitudinal straightness along a curvilinear path, while in cases of extreme compression the radial or high angle cords assume an irregular path along a curvilinear line. In fabricating the present designated tire it is necessary to use a drum setting established by the low angle straight biased plies, rather than the drum setting as would otherwise be required by a conventional radial or higher angle biased ply tire. The present tire can be built by utilizing a conventional bias tire building drum, with the tire being fabricated on the drum following presently known expedients which enable incorporation of the instant invention therein. The drum width for a given size tire and, as pointed out herebelow, no single drum width under conventional practice is suitable for the optimum tire resulting from the practice of this invention.

Moreover, the linear cord compression amplitude and frequency of the irregular cord paths can be regulated by selection of the building drum diameter, biased cord angle, radial cord twist, radial cord material, and to some degree the spacing of the picks or woof associated with the radial or higher angle ply.

Compression can be more easily effected with any cord while still retaining linearity by starting with a cord of reduced twist, which expedient reduces and defers buckling with the creation of irregular zigzag cord paths. Increasing cord compression modulus makes compression more difficult with buckling appearing more readily with formation of irregular zigzag sawtooth cord paths. The nature of the irregular cord path can be controlled by altering the distance between pick cord lines since pick cords act as weak anchor points forcing the buckling to occur outside these anchor points. Increasing the lift ratio by decreasing the building drum diameter results in greater compression of the radial ply as well as a different distribution of compression along the cord path. Similarly, change in bias cutting angle influences the degree of compression.

Table I reports various data illustrative of how appropriate cord compression can be predetermined from various mechanical factors briefly alluded to above. The predetermination of cord compression requires a knowledge of the inner peripheral dimension of the tire from bead toe to bead toe with a knowledge of the building drum width and other features. These other features require a knowledge of the distance from the edge of the building drum to the part in the green tire that corresponds to the cured bead toe. This distance varies dependent upon the drum being used, that is: an −09, −22, −28, or −48 type drum. The dash numbers indicate a feature of the building drum and are related to the ply turn-down distance from the actual surface of the drum to the ledge provided for setting the steel bead, which distance must be added to the actual drum setting to arrive at the effective drum width from bead toe to bead toe. The actual drum width is shown in the third column and the effective drum width from bead toe to bead toe is shown in the fourth column while the tire's inner peripheral dimension is listed in the fifth column of the following chart. The percent compression figure of the sixth column of the chart represents the excess length of a radially aligned cord extending from bead toe to bead toe over the actual length required to produce the specified tire size listed in column 1 and identifies the degree of compression of radially aligned cords when the tire is shaped from flat open ended barrel to toroidal. The visual appearance of the irregular zigzag cord path of the radial cords is related to this value since each cord can undergo a certain amount of linear compression without buckling which is when the irregular cord path is created.

Similar type calculations can be made when using biased plies at different angles to determine relative compression of such plies with respect to the bias plies controlling the drum width setting.

In the various embodiments disclosed in the figures of the drawing, the radial or higher angle biased ply is located externally of the remaining plies of the tire; and accordingly, when the tire rolls through its footprint and encounters an object such as a stone or ridge, great stress is applied to each of the cords bearing the brunt of the deformation. However, the outermost ply is the first to deform, followed by the remaining plies. The external higher angle ply cords which are normally under negligible tension in the inflated tire accordingly act as shock absorbers and absorb a significant amount of the shock before transmitting the remainder of the shock load on to the remaining bias cords. Hence, a proportionate reduced amount of applied stress is absorbed by each of the remaining plies with the innermost ply receiving the least proportion.

It is evident that the compressed cords of the higher angle ply become shock absorbers when placed externally of the lower angle biased plies but lose much of this capacity if placed between or underneath the innermost bias plies. The degree of compression of the radial or higher angle ply determines the tension of the individual cords thereof while the tire is running along a smooth roadway. The role of the radial or higher angle ply in conjunction with a pair of lower angle biased plies in increasing tire strength and stiffness by the creation of triangles and irregularly shaped polygons as evidenced in FIGS. 26–28 is discussed in greater detail in Applicant's U.S. Pat. No. 3,807,475 issued on Apr. 30, 1974. From the standpoint of tire strength and stiffness it makes no difference what the arrangement sequence is of the three identified plies, but from the standpoint of shock absorbance, it is obligatory that any compressed cords be located nearest the shock source for greatest efficiency.

A tire having a four ply biased ply arrangement can be employed, such as seen illustrated in FIGS. 3–10 and 22–23. In such a tire an additional or second higher angle or radial ply can be interposed between pairs of adjacent biased plies as well as retaining the outermost radial ply. In this respect, it is advantageous to terminate both the inner and outer radial plies at or near the bead heel where greater rigidity is required in the lower sidewall near the bead, assuming that the additional heat buildup can be tolerated. Otherwise the inner radial cord can be terminated nearer the buttress as exemplified by FIGS. 15 and 16. Still additional reinforcing biased plies may be required for the service application, wherein additional radial plies, full length or shortened, may be interspersed between bias plies as required to impart the desired strength and elasticity.

In FIG. 22, as the angle of cords 126 and 128 increase respective to biased cords 26 and 28; the former will progressively be placed under compression until the cord ultimately assumes an irregular cord path.

It should be understood that the various embodiments of the invention disclose various relationships between the outermost plies of the tire, the innermost plies of the tire, and any remaining plies which may be sandwiched therebetween. The concepts of the present invention enables an infinite number of different embodiments of the tire to be fabricated wherein an innermost pair of biased plies are arbitrarily positioned respective to the equatorial plane of the tire to provide the particular tire one deems it desirable to fabricate. In accordance with this invention the plies adjacent to the innermost pair of plies must be arranged at an angle which is greater than the cord angle of the innermost ply structure. The cords of any remaining ply structure positioned outwardly of the second recited structure must be arranged at least an equal or still greater angle respective to the equatorial plane of the tire and the first and second ply structure.

Looking at FIGS. 3–7, for example, it will be appreciated that the angular relationship of the outermost ply structure is increased respective to the equatorial plane of the tire, there will ultimately result the tire structure of FIG. 7 wherein the individual cord, 24 or 25, of the outermost ply structure constitutes a radial ply which lies normal to the equatorial plane. Therefore, the present invention provides a tire having plies of selective cord "tightness" and "looseness" with looseness becoming a state of actual cord compression when the invention is practiced in its most extreme form. Cords of different chemical composition may be used at will including rayon, nylon, polyester, steel, glass and Kevlar either individually or collectively in a single tire composition. Glass cord may break in extreme cases of compression but this is of little consequence since the fragments of such cords still perform their function of imparting greater elasticity to the tire. No special precautions need be employed to specially treat any cord to either increase or decrease its thermal shrinkage characteristics in order to fabricate a successful operating tire.

It is emphasized that a major contribution of the results of a tire made in accordance with the present invention can be explained in conjunction with FIGS. 22–23 and 26–28. There is minimal irregularity or compression in the radial cord paths along the lower sidewall, hence this structure greatly rigidifies or reinforces the sidewall in the area radially spaced from the bead. The cord paths assume marked irregularity at the flex line of the tire, forming all sorts of irregular geometrical configurations, which, when viewed as a whole, tie together the various different plies in a manner heretofore unknown. In some dissected tires made according to this invention the irregular geometrical figures appear to be randomly dispersed about the tire shoulder and crown, hence it would appear logical to assume that the small triangles, truncated diamonds, and myriad other complex small structures average out to pull, push, absorb, compress, and cushion the tire structure in a very desirable and unobvious manner. The complex small figures tie the various cords together so that the resulting tire structure is effectively stronger than would be expected from either a radial or biased tire of equivalent ply strength.

It is contemplated to use the present invention in fabricating automotive, truck, cycle, farm, aircraft, and giant earthmover tires of multi-plies.

TABLE I

| A TIRE SIZE | B BIAS CUTTING CORD ANGLE° (1) | C ACTUAL DRUM WIDTH INCHES | D EFFECTIVE DRUM WIDTH TQE TO TOE INCHES | E TIRE INNER PERIPHERY INCHES | F % COMPRESSION (2) | G CUT PLY WIDTH PLIES 1 & 2 | H CUT PLY WIDTH PLIES 3 & 4 | I DRUM IDENTIFICATION |
|---|---|---|---|---|---|---|---|---|
| 4.40/4.50-21 | 36 | 11.75 | 14.00 | 11.96 | 14.6 | 15¼ | 16⅞ | 21-09 |
| 4.75/5.00-20 | 37 | 12.00 | 15.00 | 13.31 | 11.3 | 16⅛ | 18¾ | 20-22 |
| 4.75/5.00-19 | 35 | 12.25 | 14.90 | 13.24 | 11.1 | 17 | 19¼ | 18-28 |
| 5.25/5.50-20 | 36 | 13.75 | 16.75 | 15.00 | 10.4 | 17⅞ | 21⅛ | 20-22 |
| 5.25/5.50-19 | 35 | 15.25 | 17.90 | — | — | 17¼, 18½ | 21⅞, 19⅞ | 18-28 |
| 5.25/5.50-18 | 32 | 14.50 | 16.75 | 14.22 | 15.1 | 18 | 20⅛ | 18-09 |
| 5.25/5.50-17 | 32 | 15.75 | 18.00 | 15.17 | 15.7 | 19¼ | 21¼ | 17-09 |
| 6.00-23 | 34-32 | 15.00 | 18.65 | 15.52 | 16.8 | 19 | 22 | 20-48 |
| 6.00-22 | 36-34 | 13.75 | 17.40 | 15.62 | 10.2 | 19 | 20 | 20-48 |
| 6.00-21 | 33-31 | 15.75 | 18.00 | 15.61 | 13.3 | 19 | 22 | 21-09 |
| 6.00-16 | 30-28 | 15.75 | 18.00 | 15.30 | 15.0 | 19¼ | 22½ | 16-09 |
| 6.00/6.50-20 | 34-32 | 15.00 | 18.00 | 16.26 | 9.7 | 19¼ | 22½ | 20-22 |
| 6.00/6.50-19 | 33-31 | 15.75 | 18.40 | 16.26 | 11.6 | 19½ | 23¼ | 18-28 |
| 6.00/6.50-18 | 30-28 | 17.00 | 19.25 | 16.25 | 15.6 | 20½ | 23¼ | 18-09 |
| 6.00/6.50-17 | 30-28 | 17.00 | 19.25 | 16.25 | 15.6 | 20½ | 23¼ | 17-09 |
| 6.50-16 | 30-28 | 17.25 | 19.50 | 16.65 | 14.6 | 20¾ | 24¼ | 16-09 |
| 7.00-21 | 35-33 | 15.75 | 19.40 | 18.15 | 6.4 | 21¼ | 25¼ | 20-48 |
| 7.00-20 | 33-31 | 17.25 | 20.05 | 18.14 | 9.5 | 21⅝ | 25¾ | 20-22 |
| 7.00-16 | 29-27 | 19.00 | 21.25 | 17.93 | 15.6 | 22½ | 27 | 16-09 |
| 7.00-15 | 28-26 | 19.00 | 21.25 | 17.92 | 15.7 | 22, 22½ | 28, 27 | 15-09 |
| 7.00/7.50-19 | 30-28 | 19.50 | 21.50 | 19.12 | 11.1 | 22¾ | 22⅞ | 18-22 |
| 7.00/7.50-18 | 28-26 | 19.75 | 22.00 | 18.75 | 14.8 | 23½ | 27¾ | 18-09 |
| 7.00/7.50-17 | 28-26 | 19.75 | 22.00 | 18.75 | 14.8 | 23¼ | 27¾ | 17-09 |
| 7.50-16 | 28-26 | 20.75 | 23.00 | 19.50 | 15.2 | 24¼ | 28⅞ | 16-09 |
| 8.00/8.20-15 | 26-24 | 20.00 | 22.25 | 18.60 | 16.4 | 26⅞, 23 | 27⅞ | 15-09 |
| 8.25-16 | 26 | 22.00 | 24.25 | 20.68 | 14.7 | 23, 26 | 29¼ | 16-09 |
| H78-15 | 30 | 21.00 | 23.00 | 18.46 | 19.8 | — | — | 16" dia. |

(1) Tires with 2 values, the second value is bias cutting angle of a cushion or breaker ply.

(2) % Compression = $100 \left( \frac{\text{I.P.D.} \times 100}{\text{Effective Drum Width}} \right)$

I claim:

1. A tire construction comprising a tire body of annular configuration and substantially U-shaped cross-section, having a pair of spaced annular edge portions and a tread wearing compound circumferentially extending thereabout; at least one bead embedded along each of said annular edge portions; a ply construction of at least three plies for supporting said tread wearing compound; the improvement comprising:

at least two of said plies are oppositely and equally biased and have the cords thereof extending from a bead on one side to a bead located on the opposed side of the tire; means by which said cords are anchored to said beads, so that the pair of oppositely biased plies are the principal support of said tread wearing compound;

and wherein said oppositely biased plies are the determining factor for establishing the building drum width to be employed for the particular sized tire having a desired inner peripheral dimension;

the third ply being positioned atop and disposed at a greater angle to the equatorial line of the tire than the paired bias plies, said third ply being subjected to linear compression so that the measured length of any individual cord of said third ply is less than the length of said cord as applied to the building drum and wherein said linear compression imparted by tire shaping is retained essentially unchanged during vulcanization.

2. The tire of claim 1 wherein the tire is composed of three plies with the top ply being disposed at an angle of at least 78° to the equatorial line of the tire with said ply edges terminating at the bead.

3. The tire of claim 2 wherein the radially oriented cord paths are arranged along an essentially straight curvilinear path between the bead and midsidewall; and, then assume a marked zigzag, sawtooth configuration from the upper buttress to midcrown.

4. The tire of claim 3 wherein all of the plies are made of polyester cord.

5. The tire of claim 1 wherein the tire is composed of four plies with the top two plies being equally and oppositely biased and being disposed at an angle which is at least 4° greater respective to the equatorial line of the tire as compared to the bottom pair of oppositely biased plies.

6. The tire of claim 1 wherein the tire is composed of at least five plies, with two pairs of equal and opposite biased plies being cut at the same bias angle and having sandwiched therebetween a ply having higher angle oriented tire cords extending across the region of the tread face and extending at least to the tire shoulder.

7. The tire of claim 6 wherein the higher angle cords are inserted between the two pairs of biased plies and extend into close proximity of the beads on either side of the tire.

8. The tire of claim 6 to which there is added a sixth ply placed atop the outermost pair of biased plies and having cords oriented at a higher angle which extend at least to the shoulder region.

9. The tire of claim 8 wherein the innermost pair of oppositely biased plies is disposed at a lesser angle to the equatorial line of the tire as compared to the outermost pair of biased cords.

10. The tire of claim 1, wherein the tire is composed of three plies with the oppositely and equally biased plies each being at an angle which is less than 45° to the equatorial plane of the tire and the third ply being at an angle to the equatorial plane which is greater than the angle of each underlying ply.

11. The tire of claim 1 wherein the two biased plies are anchored to the beads, and the third ply terminates at the bead.

12. The tire of claim 1 wherein said plies are limited to three plies, with said biased plies wrapping about the beads and said third ply extending less than all the way to the beads;
said third ply being a radial ply.

13. The tire of claim 1 wherein said third ply is disposed between the tread wearing compound and the cords of the two plies which are at greater tension as compared to the cords of the third ply.

14. The tire of claim 1 wherein said third ply cords are in less tension than the cords of said biased plies.

15. The tire of claim 1 wherein the difference in the angles of the first and second biased plies is of a magnitude to cause the cords of said third ply to be compressed along their longitudinal axis so that at least the marginal central length of the individual cords of said third ply assume an irregular cord path.

16. The tire of claim 1 wherein said third ply acts as a flexible medium permitting the two surfaces adjacent to the third ply to move laterally with respect to each other when subjected to exterior applied forces.

17. The tire of claim 1 wherein the outermost of said biased plies is disposed at a greater equatorial angle than the innermost of said biased plies, and at a lesser angle than the third ply whereby said outermost plies ply dynamically balances plies one and three to ensure imparting the precise lateral force desired for the ultimate tire structure.

18. Method of fabricating a pneumatic tire having spaced beads and a tread wearing surface supported from the beads by a plurality of plies, comprising the steps of:

(1) placing two low angle oppositely biased plies upon a tire building drum and anchoring the opposed marginal edges of the plies to the beads;

(2) placing one higher angle biased ply upon the tire building drum and adjacent to one of said low angle plies;

(3) lofting the assembly of step (2), and (4) vulcanizing the lofted tire of step (3), (5) the angle between the two low angle oppositely biased plies and the higher angle biased ply being of a magnitude which results in the cords of the higher angle ply being compressed whereby they assume a length which is less than the length of the cords as applied in step (2), and wherein the linear compression acquired by the higher angle biased ply cords during tire shaping is retained essentially unchanged during vulcanization.

19. The method of claim 18 wherein said one ply is of a radial ply construction.

20. The method of claim 18 further including the step of:

(6) selecting relative cord angles of said low and high angle plies to cause the individual cords of said high angle ply to deviate from a line which describes the shortest curvilinear path thereof.

21. The method of claim 20 wherein the individual cord paths of said high angle ply assume a highly irregular path in the crown and shoulder of the tire which diminishes in irregularity towards the midsidewall and assumes an essentially straight path between the beads and the midsidewall.

22. The method of claim 18 further including the step of:

(7) adding a fourth ply which is equal and opposite in angle to the higher angled ply whereby these two latter mentioned plies constitute a second pair of biased plies.

* * * * *